United States Patent
Davidson et al.

(10) Patent No.: US 6,735,184 B1
(45) Date of Patent: May 11, 2004

(54) INTERNET PROTOCOL NETWORK ARCHITECTURE FOR A GLOBAL SATELLITE SYSTEM

(75) Inventors: Lee Davidson, McKinney, TX (US); Eric Valentine, Plano, TX (US); David Boltz, Garland, TX (US)

(73) Assignee: Ericsson Inc, Plano, TX (US)

( * ) Notice: Subject to any disclaimer, the term of this patent is extended or adjusted under 35 U.S.C. 154(b) by 0 days.

(21) Appl. No.: 09/531,916

(22) Filed: Mar. 21, 2000

(51) Int. Cl.⁷ .............................................. H04B 7/185
(52) U.S. Cl. ........................ 370/316; 370/352; 370/401
(58) Field of Search ................... 370/310, 316, 370/328, 352, 356, 401, 389, 392, 474

(56) References Cited

U.S. PATENT DOCUMENTS

| | | | | |
|---|---|---|---|---|
| 5,121,387 A | * | 6/1992 | Gerhardt et al. | 370/322 |
| 6,044,070 A | * | 3/2000 | Valentine et al. | 370/316 |
| 6,137,783 A | * | 10/2000 | Sallberg | 370/316 |
| 6,157,621 A | * | 12/2000 | Brown et al. | 370/310 |
| 6,201,797 B1 | * | 3/2001 | Leuca et al. | 370/316 |
| 6,222,483 B1 | * | 4/2001 | Twitchell et al. | 342/357.09 |
| 6,483,820 B1 | * | 11/2002 | Davidson et al. | 370/329 |
| 6,567,668 B1 | * | 5/2003 | Valentine et al. | 455/410 |
| 6,577,862 B1 | * | 6/2003 | Davidson et al. | 370/433 |

* cited by examiner

*Primary Examiner*—Kenneth Vanderpuye
*Assistant Examiner*—Nittaya Juntima

(57) ABSTRACT

A system and method for a terrestrial IP network for efficient transmissions within a satellite-terrestrial network. The terrestrial network of a satellite-terrestrial telecommunications system provides for IP signaling between satellite access nodes without the use of dedicated, circuit switched trunks therebetween. The terrestrial network configuration provides for mobile services switching center redundancy and load sharing, as well as direct packet routing between satellite access nodes. Alternatively, a signaling gateway may be interposed on dedicated satellite access node links for converting inter-satellite access node traffic into an IP signaling format for efficient utilization of the direct links.

35 Claims, 4 Drawing Sheets

INTERNET PROTOCOL NETWORK ARCHITECTURE FOR A GLOBAL SATELLITE SYSTEM

BACKGROUND OF THE PRESENT INVENTION

1. Field of the Invention

The present invention relates generally to telecommunications systems and methods for improved signaling over satellite-terrestrial networks and, in particular, to providing Internet Protocol signaling over the terrestrial network portion of a satellite-terrestrial telecommunications system.

2. Background and Objects of the Present Invention

The evolution of wireless communication over the past century, since Guglielmo Marconi's 1897 demonstration of radio's ability to provide continuous contact with ships sailing the English Channel, has been remarkable. Since Marconi's discovery, new wireline and wireless communication methods, services and standards have been adopted by people throughout the world. This evolution has been accelerating, particularly over the last ten years, during which the mobile radio communications industry has grown by orders of magnitude, fueled by numerous technological advances that have made portable radio equipment smaller, cheaper and more reliable. The exponential growth of mobile telephony will continue to rise in the coming decades as well as this wireless network interacts with and eventually overtakes the existing wireline networks.

With reference now to FIG. 1 of the drawings, there is illustrated a Global System for Mobile Communications (GSM) Public Land Mobile Network (PLMN), such as cellular network 10, which in turn is composed of a plurality of areas 12, each with a Mobile Services Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) 20 may move freely without having to send update location information to the MSC/VLR area 12 that controls the LA 18. Each Location Area 12 is divided into a number of cells 22. Mobile Station (MS) 20 is the physical equipment, e.g. a car phone or other portable phone, used by mobile subscribers to communicate with the cellular network 10, each other, and users outside the subscribed network, both wireline and wireless. The MS also includes a Subscriber Identity Module (SIM) 13, which provides storage of subscriber related information, such as the International Mobile Subscriber Identification (IMSI) 15, which uniquely identifies a subscriber.

The MSC 14 is in communication with at least one Base Station Controller (BSC) 23, which, in turn, is in contact with at least one Base Transceiver Station (BTS) 24. The BTS is the physical equipment that provides radio coverage to the geographical part of the cell 22 for which it is responsible. It should be understood that the BSC 23 may be connected to several base transceiver stations 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLMN Service Area or Cellular network 10 includes a Home Location Register (HLR) 26, which is a database maintaining all subscriber information, e.g. user profiles, current location information, IMSI number, and other administrative information. The HLR 26 may be co-located with a given MSC 14, integrated with the MSC 14, or alternatively can service multiple MSCs 14, the latter of which is illustrated in FIG. 1.

The VLR 16 is a database containing information about all of the MSs 20 currently located within the MSC/VLR area 12. If a MS 20 roams into a new MSC/VLR area 123, the VLR 16 connected to that MSC 14 will request data about that MS 20 from the HLR database 26 while simultaneously informing the HLR 26 about the current location of the MS 20. Accordingly, if the user of the MS 20 then wants to make a call, the local VLR 16 will have the requisite identification information without having to re-interrogate the HLR 26. In the aforedescribed manner, the VLR and HLR databases 16 and 26, respectively, contain various subscriber information associated with a given MS 20.

It should be understood that the aforementioned system 10, illustrated in FIG. 1, is a terrestrially-based system. More recently, satellite-terrestrial systems have been deployed which supplement terrestrial systems to provide cellular telecommunications to a wider network of subscribers. One such satellite system, which will be implemented in the near future, is the ICO Global Communications network. Satellite systems have a distinct advantage over more traditional cellular networks in the ability to provide seamless interconnectivity between two geographically remote networks where landline interconnectivity is prohibitively expensive or physically impractical. Furthermore, the satellite network may provide complementary service to the PLMN subscriber by allowing the subscriber to receive cellular service even when the subscriber has roamed outside the geographic area covered by the subscriber's servicing PLMN.

Shown in FIG. 2 is a representative satellite-terrestrial telecommunications network, generally designated by the reference numeral 205, and hereinafter referred to as a 'satellite-terrestrial network', which includes a terrestrially-based network and a group or constellation of mid-range satellites 200 that, in a preferred embodiment, provide radio coverage throughout the world. In the satellite-terrestrial network 205, as shown in FIG. 2 of the Drawings, a system of such satellites 200 in orbits above the Earth's surface are used to provide communication between a number of Mobile Stations (MS) 210 and the satellite-terrestrial network 205.

In an effort to provide seamless interconnectivity between the satellite-terrestrial network 205 and the terrestrial fixed and mobile network 10, the satellite-terrestrial network 205 is equipped with Satellite Access Nodes (SANs) 215 which provide the primary interface between the satellites 200 with other terrestrial networks, e.g. public switched telephone network (PSTN) or public land mobile networks (PLMNs). As shown in FIG. 2, the SAN 215 itself includes a Radio Frequency Terminal (RFT) subsystem 230, which provides the radio interface between the satellites 200 and the SAN 215. Also included in the SAN 215 is a Satellite Base station Subsystem (SBS) 240, which is analogous in function to a combination of the BTS 24 and BSC 23 for GSM-based systems, as described hereinabove with reference to FIG. 1. The SBS 240 coordinates communications to and from the satellites 200 and the respective local systems servicing the area, e.g., other cellular systems coupled to the satellite-terrestrial network 205 and in communication therewith.

Within the satellite-terrestrial network 205, functionality exists in the SBS 240 for evaluating a Service Area servicing the MS 210, generally designated by the reference numeral 250 from which a given system access is being requested.

Service Area 250 can, in turn, be mapped onto a specific country or state for the purpose of disabling ciphering or routing emergency calls, e.g., 911 calls to the nearest emergency center in order to meet regulatory requirements and for provisioning appropriate language sets.

With reference again to FIG. 2, a Terrestrial Network Manager (TNM) 280 within SAN 215 performs some of the functions of the BSC 23 of FIG. 1, as well as additional functions unique to satellite based systems, e.g. multi-SAN paging and routing of registration messages to a pertinent MSC/VLR, generally designated by the reference numeral 290. In addition, the TNM 280 consults a database 260, which includes a set of tables, to decide which Channel Managers, contained within the particular SBS 240, to utilize, and which satellite beams should be used for the paging. Thus, SAN 215 provides the primary interface between a network of satellites 200 and any MS 210 in communication therewith and any external networks 270 that MS 210 may in communications with.

Although the benefits of a satellite-terrestrial network 205 are numerous, implementing such a system obviously increases the complexity of the infrastructure and presents a number of disadvantages. For example, in a preferred embodiment, each satellite 200 in the exemplary ICO satellite network provides up to 163 service links supporting up to a total of 4,500 telephone channels of time division multiple access (TDMA) coded speech. To support such a large number of communications, a great deal of inter-node signaling is required in addition to the usual PLMN control and data signaling, as is understood in the art. Particularly, the SANs must be able to quickly relay information regarding a given subscriber between other SANs generally located over great distances.

Additionally, a number of problems exist with conventional satellite-terrestrial networks relating to signaling exchanges between the satellite access nodes. A particularly troubling issue is the reliance of a given SAN 215 on a single MSC 290, which causes routing failures or latency to a subscriber in the event of MSC failure or overload. Additionally, direct inter-SAN communications are generally performed over expensive, leased trunks in a circuit switched manner, the inefficiencies of which are well known and discussed further hereinbelow.

Thus, it is an object of the present invention to provide improved global satellite network access to an Internet Protocol (IP) transport network tailored for a satellite-terrestrial transmission system.

It is another object of the present invention to provide for MSC redundancy and load sharing with respect to servicing a Satellite Base Station Subsystem in a satellite-terrestrial transmission system.

It is a further object of the present invention to provide direct packet routing for speech calls and data calls originating and terminating as circuit-switched data calls in a satellite-terrestrial transmission system.

It is still another object of the present invention to provide improved transmission efficiency without reducing speech quality in a satellite-terrestrial transmission system.

It is yet another object of the present invention to allow transmission over an IP backbone for long-distance and international transit calls in a satellite-terrestrial transmission system.

SUMMARY OF THE INVENTION

The present invention is directed to a system and method for a terrestrial IP network for efficient transmissions within a satellite-terrestrial network. The terrestrial network of a satellite-terrestrial telecommunications system provides for IP signaling between satellite access nodes without the use of dedicated, circuit-switched trunks therebetween. The terrestrial network configuration provides for mobile services switching center redundancy and load sharing and well as direct packet routing between satellite access nodes.

BRIEF DESCRIPTION OF THE DRAWINGS

A more complete understanding of the system and method of the present invention may be obtained by reference to the following Detailed Description when taken in conjunction with the accompanying Drawings, wherein.

DETAILED DESCRIPTION OF THE PRESENTLY PREFERRED EXEMPLARY EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
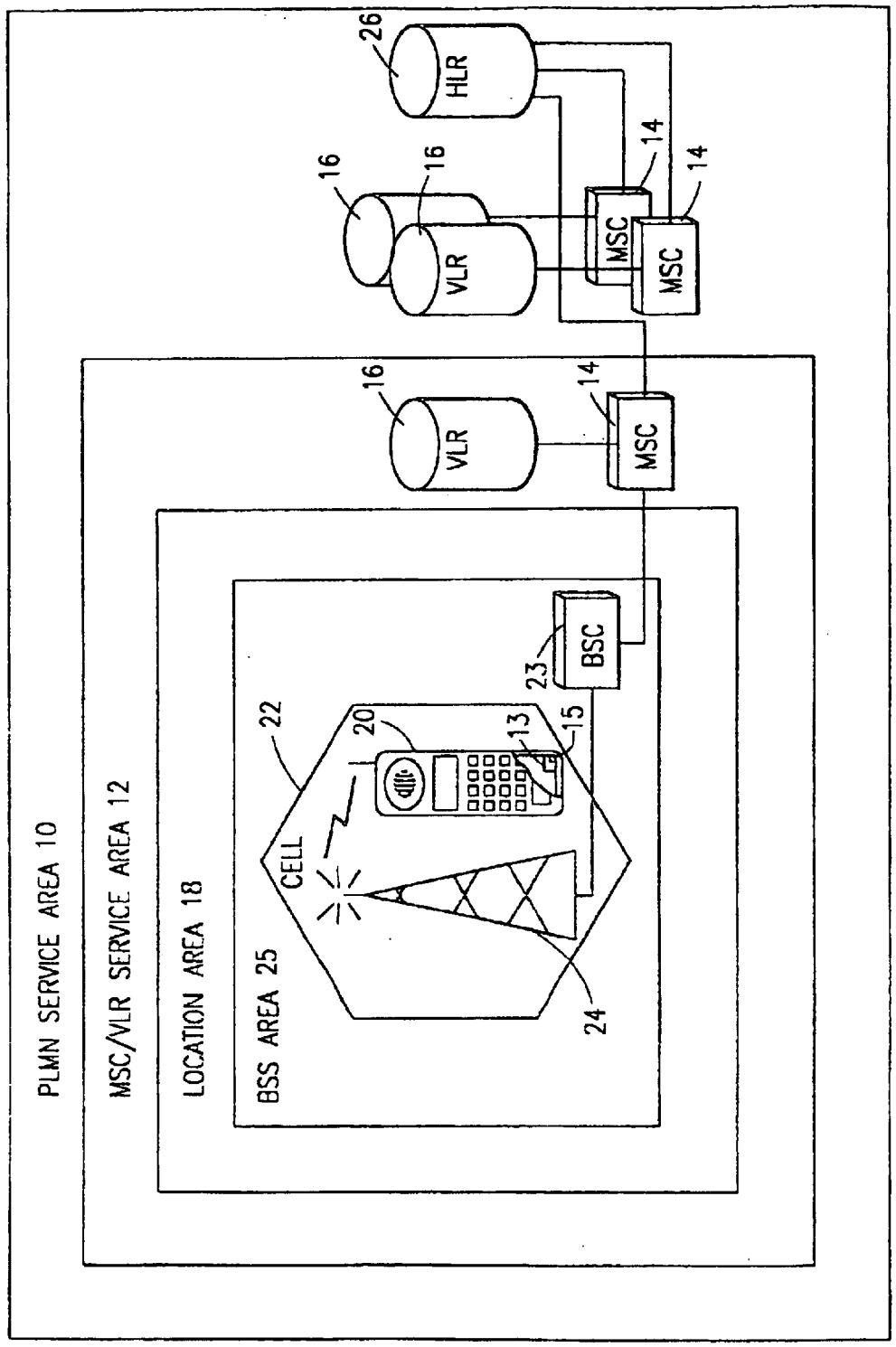
FIG. 1 is an exemplary mobile telecommunications system on which the principles of the present invention may be applied.
Figure 2:
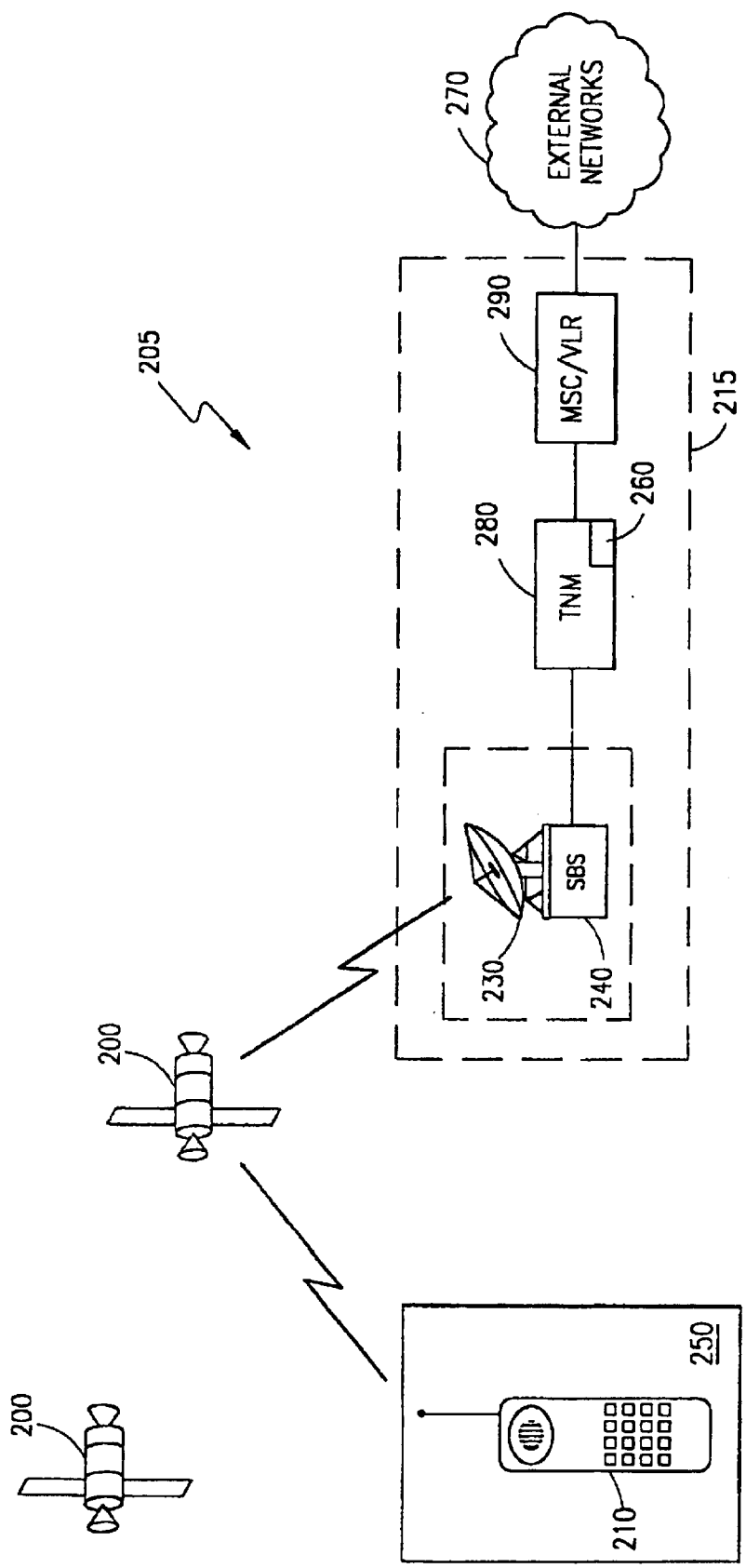
FIG. 2 is a prior art satellite terrestrial network that may be improved upon by the embodiments of the present invention.
Figure 3:
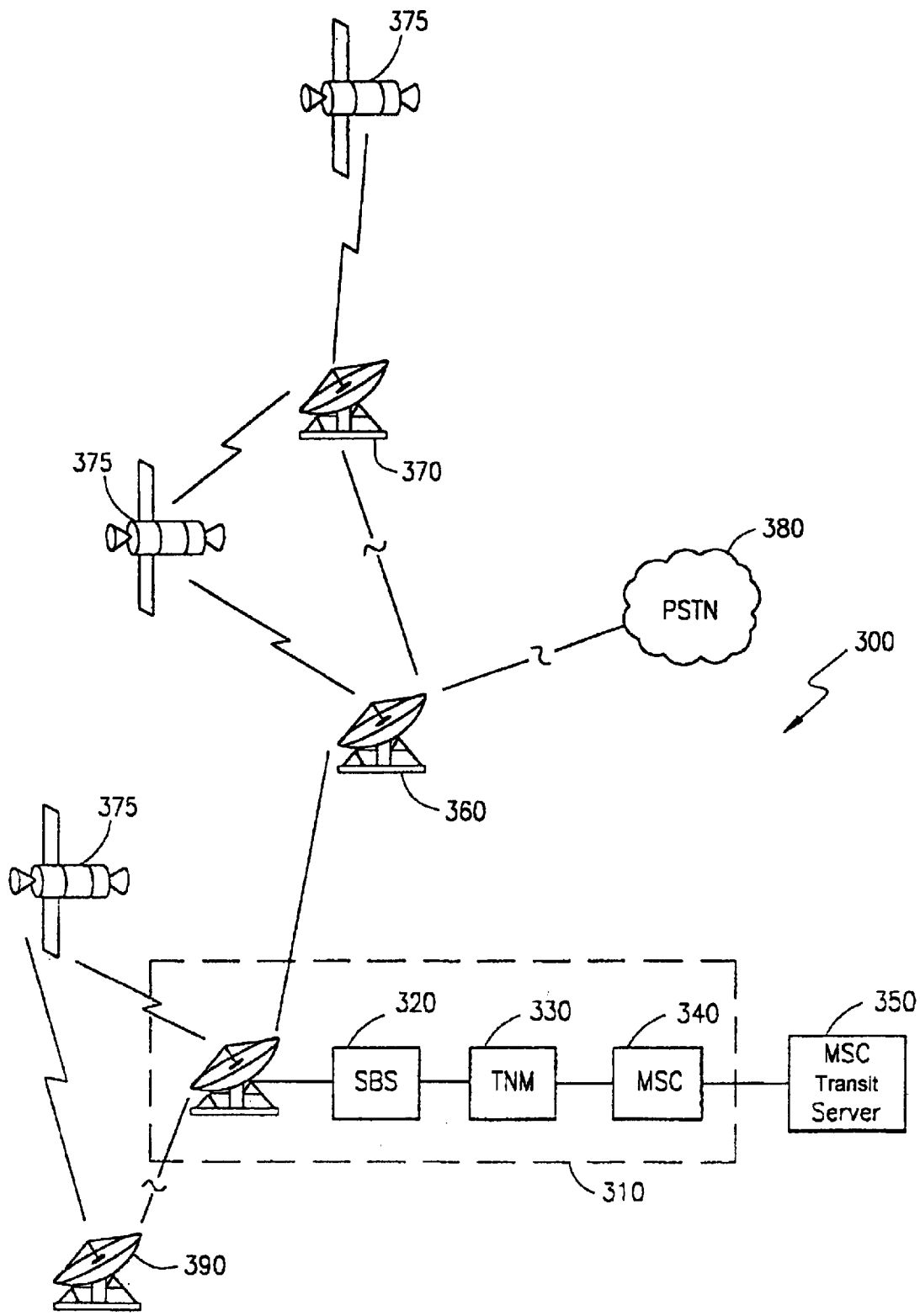
FIG. 3 is a network architecture for a global satellite-terrestrial telecommunications system upon which the present invention may be implemented.

In FIG. 3 is shown a simplified terrestrial network, generally designated by the reference numeral 300, including a number of SANs in communication with a constellation of satellites 375, preferably in mid-earth orbit. A SAN 310 includes an SBS 320, TNM 330 and MSC 340. As discussed, the SBS is analogous in function to the base station system in a terrestrial cellular network, i.e., the SAN-SBS provides the radio interface to the satellites 375 and performs such functions as channel assignment and handover. SBS 320 is coupled to a TNM 330, which interfaces to a backbone network via communication links to an MSC/Transit Server 350 included with the backbone network.

Circuit switched inter-SAN connections, e.g., between SAN 310 and additional SANs 360 and 390, carry inter-SAN traffic without utilizing the PSTN over, for example, 64 kbps G.711 PCM links. This technique is generally less expensive than connecting over the PSTN 350 since these lines may be leased or purchased. Each SAN is itself connected to its local PSTN, e.g., SAN 360 is connected to PSTN 380. It should be understood that SANs 370 and 390 are likewise interfaced to respective PSTN networks through an associated MSC/Transit Server although these PSTNs and MSCs are not shown for simplicity. In the exemplary ICO network, there are approximately 8 SANs located throughout the globe, although the exact number is inconsequential with respect to the scope of the present invention.

In a preferred embodiment, the constellation of satellites 375 comprises 10 satellites although this number is a variable dependent on the satellites' orbit and the number and geographical positioning of the SANs, as well as the desired level of global coverage.

With reference again to FIG. 3, TNM 330 is responsible for optimizing inter-SAN traffic related to the associated SAN 310. Theoretically, each 64 kbps link is capable of carrying 8 Time Division Multiple Access (TDMA) calls, although this level of efficiency is often not realized in the prior art systems. This optimization, among other factors, is dependent on an active subscriber being registered with the home SAN, which is contingent on the roaming habits of a given subscriber. Furthermore, the efficiency of an inter-SAN link is also dependent on the number of calls being carried since a full 64 kbps link will be required even if the link is only carrying a single call.

Moreover, inter-SAN transmission efficiency can be detrimentally affected by the circuit allocation over multiple interconnecting trunks. For example, an inter-SAN connection may consist of multiple T1 and E1 lines with a given one of the lines specified as a default transmission link. When multiple trunks are used between two SANs, there will, of course, often be times when each trunk is carrying less traffic than the respective trunk's capacity since as calls are being added and dropped, newly available capacity on a given trunk could be more efficiently utilized by ongoing calls occurring over a different trunk. Due to the circuit-switched nature of the prior art, however, once an ongoing call is carried over a given link, that link must be maintained until call termination. In other words, while new calls will be routed over the default link when capacity allows, ongoing calls switched over a non-default trunk will be maintained across that trunk even when capacity becomes available over the default. These inefficiencies can profoundly affect the economics of maintaining such a network, as transmission costs between SANs can total hundreds of millions of dollars per year for an exemplary global network as described herein.

Figure 4:
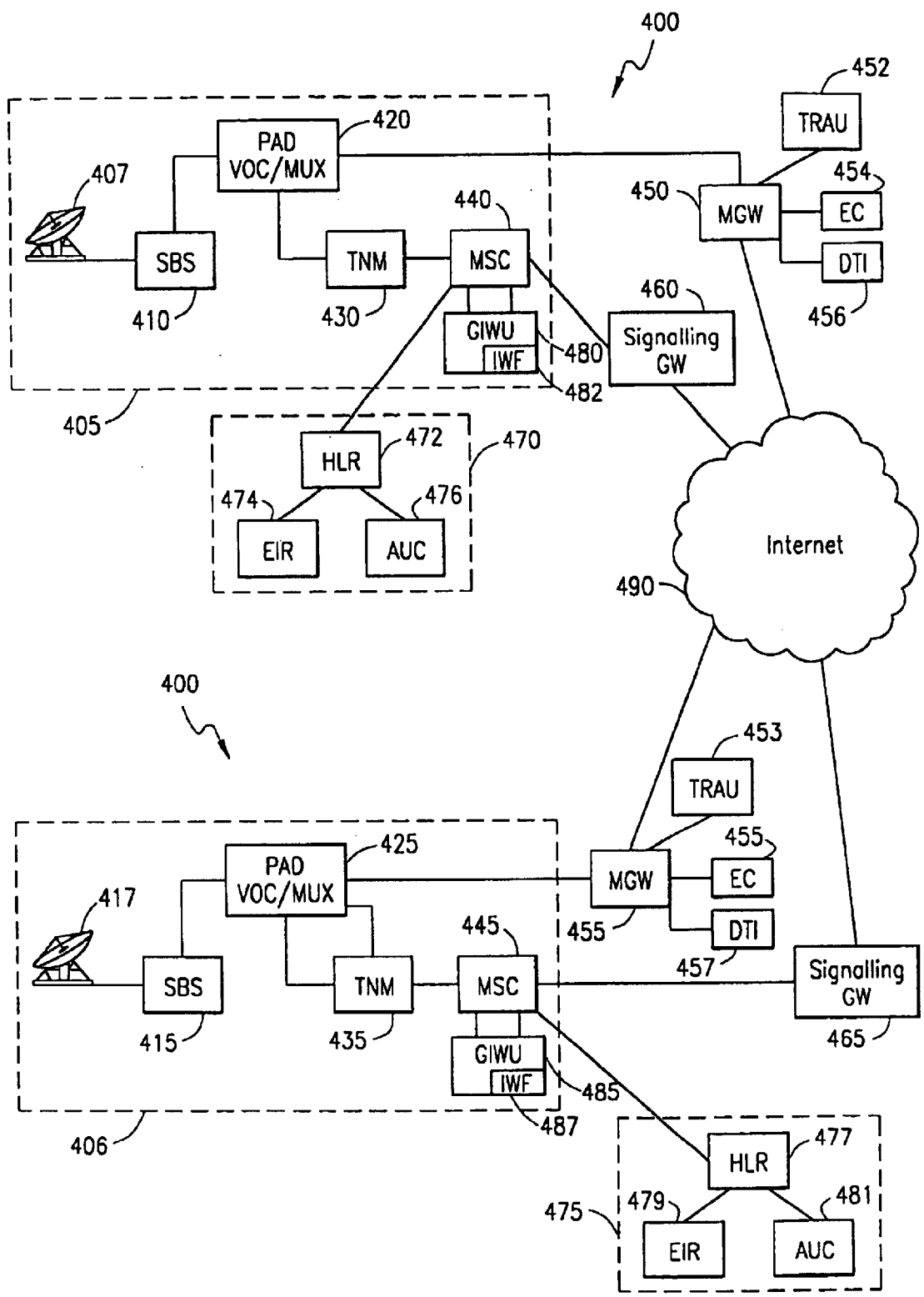
FIG. 4 is a network architecture for a global satellite-terrestrial telecommunications system in a preferred embodiment of the present invention.

The present invention improves upon the prior art by modifying the terrestrial-network to advantageously allow Internet Protocol (IP) transport communications, as illustrated in FIG. 4. Pursuant to overcoming the inefficiencies of inter-SAN transmissions across dedicated, circuit-switched trunks as aforedescribed in the prior art systems, the dedicated inter-SAN links have been removed from the terrestrial network, generally designated by the reference numeral 400 while direct communications between a plurality of SANs, e.g., SANs 405 and 406, can be routed through the Internet 490 with the inherent benefits had by utilizing a packet-switching protocol, as described further hereinbelow.

With reference to FIG. 4, a packet assembler/disassembler (PAD) 420 is added to the A'-interface of SAN 405 to allow SAN 405 communications to be packetized and routed through the GSM infrastructure to the Internet 490 according to IP transportation protocols. To this end, the SANs 405 and 406 will be furnished with IP addresses, as will the SANs' respective MSCs 440 and 445. SAN 406 is likewise equipped with a PAD 425 for respectively packetizing and depacketizing communications from and to SAN 406. For payload transmissions, PADs 420 and 425 also preferably contain multiplexing capabilities for multiplexing coded speech through the transmission layer of satellite-terrestrial network 400. Although PADs 420 and 425 are illustrated as containing the multiplexing capabilities, it should be understood that the voice multiplexing (voc/mux) could be performed at a separate node in communication with PADs 420 and 425. MSCs 440 and 445 are preferably each coupled to respective Internetworking units 480 and 485 for provisioning modem and fax adaptor pools and performing rate adaption during data communications.

A significant departure from the prior art infrastructure configuration is the location of the Transcoder and Rate Adaptor Unit (TRAU) 452 which has previously been located within, or directly coupled to, the TNM 430 of SAN 405. In a preferred embodiment of the present invention, the TRAU 440 is implemented in or colocated with a media gateway (MGW) 450 in the transmission layer of the satellite-terrestrial communications network, thus relieving the MSCs 440 and 445 of payload transmissions between the radio access part, i.e. the radio frequency transmitters (RFTs) 407 and 417, SBSs 410 and 415 and TNMs 430 and 435, and the terminating point. This provides a distinct advantage over prior art satellite-terrestrial networks and, in fact, prior art public land mobile networks. In PLMNs, the TRAU is incorporated into the Base Station Systems thus requiring all payload transmissions to be routed through the controlling switching system. The preferred embodiment, by placing the TRAUs 452 and 453 in direct communication with respective MGVVs 450 and 455, improves upon the prior art by allowing MSCs 440 and 445 to communicate signalling and call control data while payload transmissions are maintained in the transmission layer of the network without being intermediately routed through the control layers of the network.

MSCs 440 and 445 are each interfaced to PLMN switching systems 470 and 475 for obtaining necessary information for authorizing and proper routing of calls, e.g. subscription and location information from HLRs 472 and 477, authentication and ciphering keys from authentication centers (AUCS) 476 and 481 and international mobile equipment identity from equipment identity registers (EIRS) 474 and 479. MSCs 440 and 445 are also interfaced to external networks, e.g. the Internet 490, through respective signaling gateways (GWs) 460 and 465.

Pursuant to allowing direct packet routing for inter-SAN communications in accordance with IP network transmissions, the A-MSSC interface is modified to include the address of the gateway where transcoding is performed for speech calls or where the interworking function (IWF) handles circuit switched data calls. Thus, MSCs 440 and 445 are provided with respective IP addresses so that they may be properly addressed for data call processing by the associated IWFs 482 and 487. Likewise, MGWs 450 and 455 are respectively provided with IP addresses for proper routing and handling of voice calls as are TNMs 430 and 435. It should be apparent that although only two MSC service areas are depicted, any number of such service areas may be implemented in the present invention and the exemplary depiction is provided for simplicity of discussion only. A direct result of a plurality of MSC service areas with each MSC being IP addressable as described in current exemplary embodiment is the ability of MSC load sharing and redundancy. This is resultant from the SANs ability to address a plurality of MSCs by their individual IP addresses. This capability can be further enhanced by modifying MSCs (not shown) within individual PLMNs 470 and 475.

The point of IP termination is flexible in the ongoing example. Since the switching system itself is modular in nature, MGWs 450 and 455 are a natural point of selection for IP termination and are a suitable selection for terminating the IP transmission plane. However, this implies carrying pulse code modulated (PCM) data across the core network with transformation to IP occurring at the boundary between the radio access part and the core network. A more preferred implementation requires IP support in TNMs 430 and 435 and is thus included in a preferred embodiment of the present invention. Regardless, the MSCs 440 and 445 controlling a given call are responsible for network address resolution from a given IP address and are so modified from the prior art enable destination address resolution as requisite for IP routing procedures as well understood by skilled artisans.

As will be recognized by those skilled in the art, the innovative concepts described in the present application can be modified and varied over a wide range of applications. Accordingly, the scope of patented subject matter should not be limited to any of the specific exemplary teachings discussed but rather by the following claims.

What is claimed is:

1. A satellite telecommunications system having a plurality of satellites, said system comprising:
    a first satellite access node in communication with at least one of said plurality of satellites across an air interface;
    an Internet protocol transmission means, connected to said first satellite access node, for transmitting a communication from said first satellite access node to another node across an Internet protocol network;
    a first mobile services switching center for coordinating communications between a plurality of mobile subscribers, public switched telephone network subscribers, and satellite subscribers; and
    a first terrestrial network manager wherein a communication destined for said another node within said satellite telecommunications system is received by said first terrestrial network manager wherein a destination IP address for said communication is provided to said first terrestrial network manager by said mobile services switching center.

2. The satellite telecommunication system according to claim 1, wherein said first satellite access node is coupled to a media gateway for providing a communication interface to said internet protocol network.

3. The satellite telecommunications system according to claim 1, wherein said Internet protocol transmission means transmits said communication across said Internet protocol network using a destination IP address corresponding to said another node.

4. The satellite telecommunications system according to claim 3, wherein said destination IP address is associated with a component selected from a group consisting of said first satellite access node, a second satellite access node, a mobile services switching center, a media gateway, and a terrestrial network manager.

5. The satellite telecommunications system according to claim 1, wherein said first satellite access node comprises:
    a radio frequency terminal for providing a radio interface with said at least one of said plurality of satellites.

6. The satellite telecommunications system according to claim 1, wherein said first satellite access node comprises:
    a base station subsystem for coordinating communication with at least one terrestrial communication network associated with said satellite access node.

7. The satellite telecommunication system according to claim 1, wherein said mobile services switching center is in communication with an interworking unit.

8. The satellite telecommunication system according to claim 1, wherein said mobile switching center is coupled to a signaling gateway for providing signaling conversion between said first satellite access node and said Internet protocol network.

9. The satellite telecommunications system according to claim 1, wherein said destination IP address specifies a second satellite access node, said first satellite access node and said second satellite access node establishing inter-satellite access node communications therebeeen after reception of said communication by said first satellite access node.

10. The satellite telecommunications system according to claim 9, wherein said inter-satellite access node communications are established between said first terrestrial network manager and a second terrestrial network manager associated with said second satellite access node.

11. The satellite telecommunications system according to claim 10, wherein said inter-satellite access node communications are established with a destination IP address specifying said second terrestrial network manager.

12. The satellite telecommunications system according to claim 9, wherein said inter-satellite access node communications are established between said first terrestrial network manager and a media gateway associated with said second satellite access node.

13. The satellite telecommunications system according to claim 12, wherein said inter-satellite access node communications are established with said destination IP address specifying said media gateway.

14. A satellite telecommunications system having plurality of satellites, said system comprising:
    a first satellite access node in communication with at least one of said plurality of satellites across an air interface;
    an Internet protocol transmission means, connected to said first satellite access node, for transmitting a communication from said first satellite access node to another node across an Internet protocol network; wherein said another node is a second satellite access node;
    wherein said communication is packetized by a packet assembler/disassembler associated with said first satellite access node and subsequently transferred to said second satellite access node and depacketized by a second packet assembler/disassembler associated with said second satellite access node, said second satellite access node specified by a destination IP address; and
    wherein a pulse code module circuit-switched channel is established between a media gateway associated with said second satellite access node and a terrestrial network manager associated with said second satellite access node and a transcoder and rate adaptor unit (TRAU) associated with said media gateway performs transcoding and rate adaption on said pulse code modulation circuited-switched channel.

15. The satellite telecommunication system according to claim 14, wherein said pulse code modulation circuit-switched channel operates at 64 kbit/s.

16. The satellite telecommunication system according to claim 14, wherein said depacketized communication is transferred across said pulse code modulation circuit-switched channel to said terrestrial network manager.

17. In a satellite telecommunications system including, a satellite access node in communication with at least one of a plurality of satellites across an air interface, a second satellite access node, and a media gateway associated with said second satellite access node, comprisig:
    said satellite access node further comprising:
        a packetizing means for packetizing a communication received by said satellite access node; and
        an Internet protocol transmission means for transmitting said packetized communication across an Internet protocol network; and a terrestrial network manager associated with said second satellite access node wherein a pulse code modulation circuit-switched channel is established betneen said media gateway and said terrestrial network manager and wherein said terrestrial network manager performs transcoding and rate adaption on said pulse code modulation circuit-switched channel.

18. The satellite access node according to claim 17, wherein said packetizing means comprises a packet assembler/disassembler.

19. The satellite access node according to claim 18, wherein packetizing means depacketizes a packetized communication.

20. The satellite access node according to claim 17, further comprising:
a radio frequency terminal for providing a radio interface with said at least one of said plurality of satellites.

21. The satellite access node according to claim 17, wherein said first satellite access node composes:
a base station subsystem for coordinating communication with at least one terrestrial communication network associated with said first satellite access node.

22. The satellite access node according to claim 17, wherein said first satellite access node is coupled to a media gateway for providing a communication interface to said Internet protocol network.

23. The satellite access node according to claim 17, wherein said internet protocol transmission means transmits said communication using a destination IP address.

24. The satellite access node according to claim 23, wherein said destination IP address is associated with a component selected from a group consisting of said first satellite access node, a second satellite access node, a mobile services switching center, a media gateway, and a terrestrial network manager.

25. The satellite access node according to claim 17, wherein said pulse code modulation circuit-switched channel operates at 64 kbit/s.

26. The satellite access node according to claim 17, wherein a said depacketized communication is transferred across said pulse code circuit-switched channel to said terrestrial network manager.

27. The satellite access node according to claim 17, wherein said pulse code modulation circuit-switched channel operates at 64 kbit/s, and wherein said transcoding and rate adaption extracts speech signals on 16 kbit/s channels and data signals on 16 kbit/s channels.

28. The satellite access node according to claim 27, wherein said transcoding and rate adaption extracts data signals on 8 kbit/s channels.

29. In a satellite telecommunications system including, a satellite access node in communication with at least one of a plurality of satellites acos an air interface, comprising:
said satellite access node further comprising:
a packetizing means for packetizing a communication received by said satellite access node; and
an Internet protocol transmission means for trasmiting said packetized communication across an Internet protocol network;
a first terrestrial network manager; and
a first mobile services switching center for coordinating communications between a plurality of mobile subscribers, public switched telephone network subscribers, and satellite;
wherein said mobile services swithing center is couopled to a signaling gateway for providing siqnaling conversion between said first satellite access node and an Internet protocol network and wherein a communication destined for a second satellite access node is received by said first terrestrial network manager and a destination IP address for said communication is provided to said first terrestrial network manager by said first mobile services switching center.

30. The satellite access node according to claim 29, wherein said mobile services switching center is in communication with an interworking unit.

31. The satellite access node according to claim 29, wherein said destination IP address specifies said second satellite access node, said first satellite access node and said second satellite access node establishing inter-satellite access node communications therebetween after reception of said communication by said first satellite access node.

32. The satellite access node according to claim 31, wherein said inter-satellite access node communications are established between said first terrestrial network manager and a second terrestrial network manager associated with said second satellite access node.

33. The satellite access node according to claim 32, wherein said inter-satellite access node communications are established with a destination IP address specifying said second terrestrial network manager.

34. The satellite access node according to claim 31, wherein said inter-satellite access node communications are established between said first terrestrial network manager and a media gateway associated with said second satellite access node.

35. The satellite access node according to claim 34, wherein said inter-satellite access node communications are established with a destination IP address specifying said media gateway.

* * * * *